UNITED STATES PATENT OFFICE.

THEODORE BRENTANO WAGNER, OF CHICAGO, ILLINOIS.

PROCESS OF MANUFACTURING ANHYDROUS GRAPE-SUGAR.

No. 835,145.   Specification of Letters Patent.   Patented Nov. 6, 1906.

Application filed November 15, 1904. Serial No. 232,807.

*To all whom it may concern:*

Be it known that I, THEODORE BRENTANO WAGNER, a citizen of the United States, residing in Chicago, in the county of Cook and State of Illinois, have invented a new and useful Improved Process of Manufacturing Anhydrous Grape-Sugar from Corn and Analogous Farinaceous Material, of which the following is a specification.

According to the present method of manufacturing anhydrous grape-sugar, wet starch obtained from corn is treated with dilute acid, such as hydrochloric acid or sulfuric acid, at an elevated temperature, and the subsequent sugar liquor is neutralized with commercial sodium carbonate $Na_2CO_3$. This liquor is then concentrated by evaporation *in vacuo* to about 29° Baumé. It is then clarified by filtering through bone-black, and is then further concentrated *in vacuo* until the water contents equal approximately seventeen per cent., by weight. After passing through a cooler a small amount of the "induction" seed of anhydrous grape-sugar is added in order to facilitate and induce further crystallization of anhydrous grape-sugar. This heavy liquor is then run into molds, which are piled up on wagons and communicate with each other, so that by admitting the liquor into the top mold or receptacle the whole series of molds is filled from the bottom up. These wagons with the sugar-molds are then delivered to the crystallizing-room, which is kept at a temperature varying from 90° to 100° Fahrenheit. Here the formation of the crystals begins, great care being had that no vibration exists in the crystallizing-room, with the object of breeding crystals of the required size, from which the mother-liquor can be separated by centrifugal force. Crystallization in this room requires on an average three days, sometimes a little less, sometimes more time. If the crystallization appears to have progressed sufficiently at the end of that time, the molds are taken from the wagons and placed in centrifugal machines in order to remove the mother-liquor still adhering. The cakes of sugar are then broken out and scraped in order to remove the discolored sugar, and the contents of the molds are finally carried to the curing-bins, where a curing process is carried on, which usually requires about ten days. The sugar is then ready to be packed for the market. The time thus required from the time the sugar liquor is finished in the vacuum-pan up to the time when the sugar is put into packages is ordinarily between twelve and fourteen days, and the anhydrous grape-sugar thus obtained has the following average composition: Dextrose, ninety-one per cent.; water, five and five-tenths per cent.; ash, six-tenths per cent.; other bodies, two and nine-tenths per cent.

It is obvious that the manufacture of anhydrous grape-sugar by this method is connected with heavy expenses, partly due to the numerous manipulations and operations, each requiring labor; partly due to the large stock necessarily carried in process on account of the necessary time required to finish the sugar, and partly due to the numerous repairs incidental to the required machinery. A serious defect in this process of manufacturing anhydrous grape-sugar is to be found also in the unsatisfactory yield produced, as only forty to fifty per cent. of finished sugar is obtained from one hundred parts of sugar liquor.

The object of my invention is to produce anhydrous grape-sugar from corn or other analogous farinaceous material by a method in which the yield of sugar is larger, its quality is purer, the time required for its production is shortened, and the amount of labor required is materially lessened. I have found that all of these results may be obtained by abandoning that part of the present process which has heretofore been considered necessary—that is, keeping the crystals during the process of generation in as quiet and still a condition as possible, and, on the contrary, employing the principle of crystallization in motion.

I prefer the following method for carrying out my invention: The sugar liquor is dropped from the vacuum-pan into a tank, where a small amount of induction seed is added. From this tank the contents are delivered to the crystallizer at a temperature of about 100° Fahrenheit to about 130° Fahrenheit, and an agitator in the latter is set in motion, revolving at a speed of from one revolution in one minute to one revolution in five minutes, according to the concentration of the liquor.

The crystallizer is provided with an exterior jacket, to which either a heating agent or a cooling agent can be supplied, as required, so that the desired temperature is maintained, and this is of importance. The crystallization sets in after a very short time and is completed within from ten to twelve hours, and sometimes less, depending upon conditions, as will be readily understood by those skilled in the art. The sugar mass, consisting of very minute but fully developed anhydrous crystals contained in the mother-liquor, is now subjected to pressure in a suitable machine or apparatus in order to remove the uncrystallized liquor. The pressed mass is then broken up, run through a mill, and without further curing is ready to be put into packages for the market. Thus only twelve to fifteen hours are required from the time that the sugar has been dropped from the vacuum-pan in order to produce a marketable sugar.

Of course my invention includes and contemplates also the use of centrifugal machines for removing the mother-liquor.

The mother-liquor obtained from pressing or centrifugaling the sugar may be transferred to a crystallizer and the process of crystallizing in motion repeated.

The sugar obtained by my method above described also possesses a higher purity than that produced by the present method. My sugar has approximately the following compositions: Dextrose, ninety-eight per cent.; water, one and five-tenths per cent.; other matter, five-tenths per cent. It will thus be seen that the purity of my sugar is ninety-nine per cent., as compared with 96.5 per cent. in the case of the sugar now produced. Furthermore, my sugar is of a pure white color, whereas the "old sugar," as I may term it, has almost always been discolored and has a yellowish appearance. My sugar has, therefore, a greater commercial value aside from its greater purity, as it gives the brewer or the wine-manufacturer or any other consumer a greater yield than the old sugar.

Having thus described my invention, what I claim is—

1. The process of making anhydrous crystals of grape-sugar from a grape-sugar liquor which consists in agitating the liquor during the formation of crystals and subsequently removing the mother-liquor, substantially as described.

2. The process of making anhydrous crystals of grape-sugar from a grape-sugar liquor which consists in agitating the liquor at an elevated temperature during the formation of crystals and subsequently removing the mother-liquor, substantially as described.

3. The process of making anhydrous crystals of grape-sugar which consists in producing a grape-sugar liquor having a temperature of about 100° Fahrenheit to about 130° Fahrenheit, agitating said liquor at about said temperature to form the crystals and subsequently removing the mother-liquor, substantially as described.

4. The process of making anhydrous crystals of grape-sugar which consists in (a) producing a grape-sugar liquor having a temperature of about 100° Fahrenheit to about 130° Fahrenheit, (b) adding a small amount of induction seed to the liquor, (c) agitating said liquor at about said temperature to form crystals and (d) subsequently removing the mother-liquor, substantially as described.

THEODORE BRENTANO WAGNER.

Witnesses:
E. R. SKINNER,
F. L. JEFFERIES.